United States Patent
Hall

[11] Patent Number: 5,949,740
[45] Date of Patent: Sep. 7, 1999

[54] UNBALANCED FIBER OPTIC MICHELSON INTERFEROMETER AS AN OPTICAL PICK-OFF

[75] Inventor: David B. Hall, La Crescenta, Calif.

[73] Assignee: Litton Systems, Inc., Woodland Hills, Calif.

[21] Appl. No.: 08/848,090

[22] Filed: Jun. 6, 1997

[51] Int. Cl.[6] .................................................. H04R 1/44
[52] U.S. Cl. ............................................................ 367/149
[58] Field of Search ........................... 367/149; 356/345; 250/227.14, 227.27; 385/12, 13

[56] References Cited

U.S. PATENT DOCUMENTS

| | | | |
|---|---|---|---|
| 4,446,543 | 5/1984 | McLandrich et al. | 367/149 |
| 4,799,797 | 1/1989 | Huggins | 250/227.27 |
| 5,448,058 | 9/1995 | Arab-Sadeghabadi et al. | 250/225 |
| 5,529,671 | 6/1996 | Debley et al. | 204/192.34 |
| 5,675,415 | 10/1997 | Akatsu et al. | 356/364 |

FOREIGN PATENT DOCUMENTS

| | | |
|---|---|---|
| 0196784 | 10/1986 | European Pat. Off. . |
| 1-237430 | 9/1989 | Japan . |
| 2-302632 | 12/1990 | Japan . |
| 07260617 | 10/1995 | Japan . |
| 8-35811 | 2/1996 | Japan . |
| 09005028 | 1/1997 | Japan . |

OTHER PUBLICATIONS

Kersey, "distributed and Multiplexed Fiber Optic Sensors", in Udd, Ed., *Fiber Optic Sensors: An Introduction for Engineers and Scientists*, (New York, 1991), pp. 347–363.

*Primary Examiner*—Daniel T. Pihulic
*Attorney, Agent, or Firm*—Klein & Szekeres, LLP

[57] ABSTRACT

A system for measuring changes in an environmental parameter, such as velocity or pressure, includes an optical signal source for providing a pulsed, coherent light signal, and an interferometer having a first and second optical legs of unequal optical path lengths. The signal is split into first and second beams that are respectively directed into the first and second optical legs of the interferometer. A fixed mirror reflects the first beam received at the end of the first optical leg. An optical pick-off includes a movable mirror, positioned to reflect the second beam received from the end of the second optical leg. The movable mirror is movable in response to changes in the value of the parameter to be measured. An optical coupler combines the first and second beams after they have been reflected back into their respective optical legs, producing an interference signal, which is detected by an optical detector. The detector generates an electronic signal having a value indicative of the value of the interference signal. The electronic signal is analyzed to correlate its value to changes in the value of the environmental parameter to be measured.

24 Claims, 2 Drawing Sheets

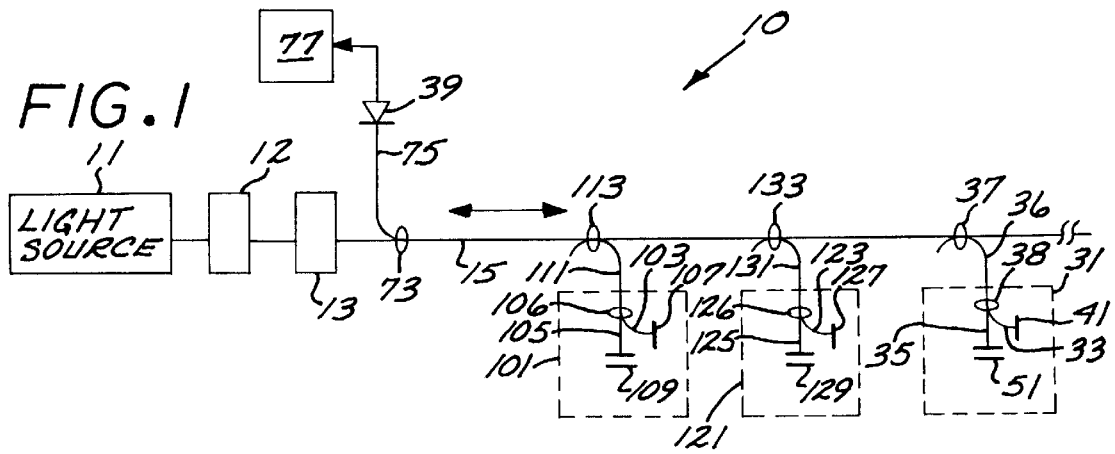
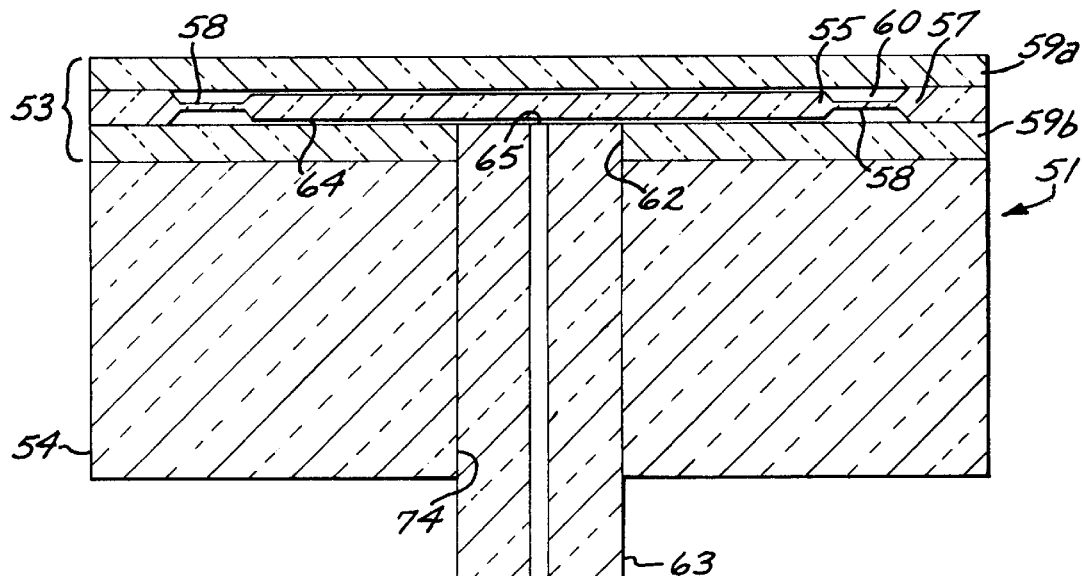

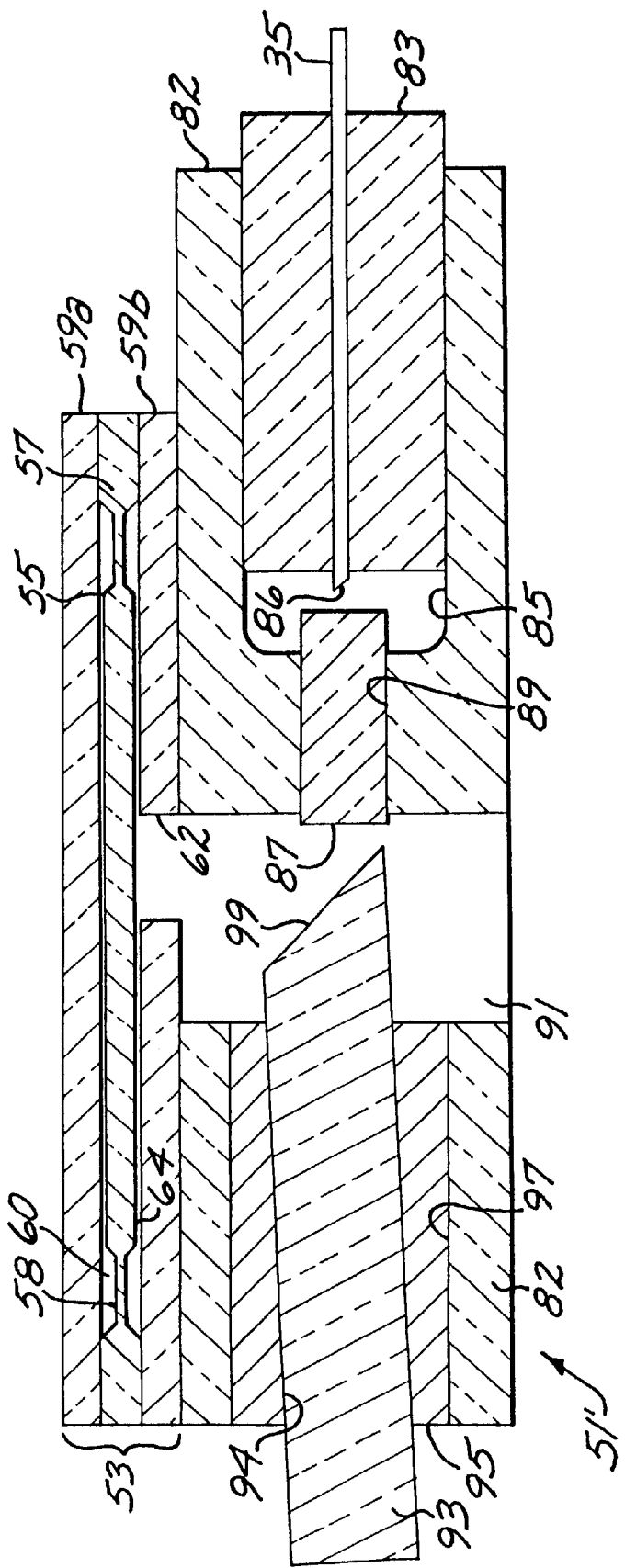
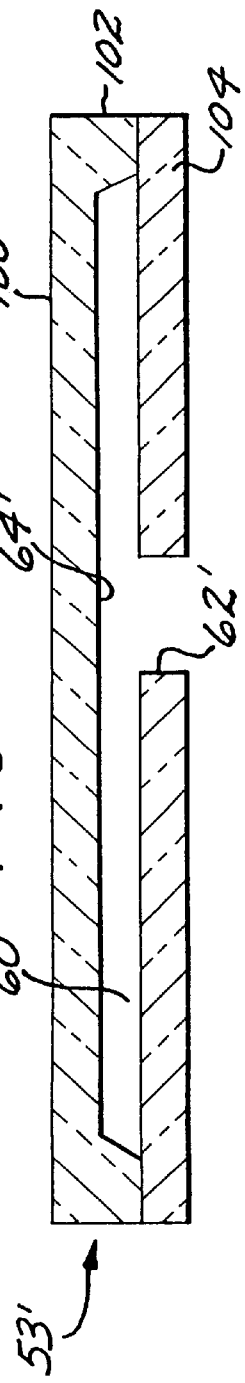

UNBALANCED FIBER OPTIC MICHELSON INTERFEROMETER AS AN OPTICAL PICK-OFF

CROSS-REFERENCE TO RELATED APPLICATIONS

Not Applicable

FEDERALLY SPONSORED RESEARCH OR DEVELOPMENT

Not Applicable

BACKGROUND OF THE INVENTION

The present invention relates to optical interferometers used to measure changes in environmental parameters such as pressure or velocity. The invention includes an optical pick-off as part of an interferometer that can be used in an acoustic sensor or an accelerometer.

Michelson or Mach-Zehnder interferometers have been known for use in certain applications, such as acoustic sensors. A description of a Mach-Zehnder interferometer used in an acoustic sensor for underwater use is contained in U.S. Pat. No. 5,448,058 to Arab-Sadeghabadi et al.

An optical interferometer of known type includes a pair of optical fibers into which a single source of light directs a light signal. The light signals, guided respectively through the two fibers, follow optical paths of different lengths, producing a phase difference between the two signal beams when the beams are combined. The combined beams may be detected by an optical detector. If the two signal beams have the same polarization state when they are combined, the signals interfere to form a fringe pattern, of bright and dark lines, that is detected by the optical detector.

Exposing either or both of the fibers to a change in the environmental parameters, such as an acoustic pressure change, changes the fringe pattern that is incident on the optical detector. Such changes in the fringe pattern as detected by the optical detector may be analyzed to measure the changes in the environmental parameters to which the fiber has been exposed. In this manner, the nature of the acoustic waves to which the fiber is exposed may be determined when the interferometer is used in an acoustic sensor.

Mach-Zehnder or Michelson interferometers employed in underwater acoustic sensor ("hydrophone") systems use tens of meters of optical fiber wrapped on a mandrel. The fiber is stretched to produce a measured phase delay that is proportional to the changes in pressure resulting from acoustic waves. The interferometer has an optical path length mismatch between its two optical legs that is on the order of one meter, to allow the standard functioning and signal processing with a phase-generated carrier. See, for example, Kersey, "Distributed and Multiplexed Fiber Optic Sensors", in Udd, Ed., *Fiber Optic Sensors: An Introduction for Engineers and Scientists*, (New York, 1991), pp. 347–363.

Fiber optic interferometric sensor systems, of the types described above, have found favor over piezoelectric hydrophone systems, due to such advantages as immunity to electromagnetic interference (EMI), the ability to locate all electronic and electrical components and systems in the towing vessel, rather than in the underwater environment, and the facility in measuring vector quantities. The prior art fiber optic sensor systems, however, are relatively expensive to manufacture, and less expensive alternatives that provide the same advantages over piezoelectric systems have been sought. Batch-processed silicon chip sensors, having a proof mass that is moved in response to environmental changes such as pressure and acceleration, have been employed as accelerometers and velocity sensors. Such silicon sensors are very inexpensive and quite rugged. Use of such silicon sensors in a hydrophone system, with the proof mass accessed by a fiber optic delivery system, would lower costs as compared with prior art fiber optic systems. Making such chip sensors compatible with existing fiber optic architectures in Mach-Zehnder and Michelson interferometric sensing systems and the like has, however, proved troublesome in practice.

It would therefore be a significant advancement in the state of the art to provide a fiber optic interferometric sensor system, in a hydrophone or like application, that is capable of employing common, batch-processed silicon sensors.

SUMMARY OF THE INVENTION

The present invention is a measuring system that uses an inexpensive silicon chip sensor in an optical interferometer to measure pressure, velocity, acceleration, or other environmental attributes or parameters. The sensor includes a movable proof mass that is used as a movable mirror at the end of one leg of an interferometer having two unequal length legs. The proof mass of the silicon chip sensor moves in response to a change in a particular environmental parameter, changing the optical length of the interferometer leg.

The present invention includes an optical signal source for providing a pulsed, coherent light signal, and an interferometer having first and second fiber optic legs of unequal optical path length. The signal is split into first and second beams that are respectively directed into the first and second fiber optic legs. A fixed end mirror is placed on the end of the first of the fiber optic legs for reflecting the first beam received at the end of the first fiber optic leg. An optical pick-off is fixed beyond the end of the second of the fiber optic legs. The optical pick-off comprise, a sensor having a proof mass that is movable relative to the end of the second fiber optic leg. The surface of the proof mass is reflective and positioned to reflect the second beam received from the end of the second fiber leg. An optical coupler combines the first and second beams reflected from the fixed end mirror and the proof mass, producing an interference signal. An optical detector optically coupled to the coupler detects the interference signal of the combined beams and generates an electronic signal having a value indicative of the value of the interference signal. The electronic signal is analyzed to correlate its value to changes in the value of the environmental parameter to be measured.

The measuring system of the present invention provides an accurate, relatively low-cost fiber optic interferometric sensor system, in a hydrophone or like application, that employs common, batch-processed silicon sensors, and that is completely compatible with existing fiber optic architectures.

BRIEF DESCRIPTION OF THE DRAWINGS

FIG. 1 shows a measuring device constructed according to the invention incorporating several interferometers;

FIG. 2 is a cross sectional view of a silicon sensor chip, of the type that may be employed as a velocity sensor, and one embodiment of a supporting block for holding the sensor chip and the end portion of the optical fiber in an optical pick-off constructed according to the invention;

FIG. 3 is a cross-sectional view of the silicon sensor chip of FIG. 2 and a second embodiment of a supporting block for holding the sensor and the end portion of the optical fiber in an optical pick-off constructed according to the invention; and FIG. 4 is a cross-sectional view of an alternative structure of a silicon sensor chip that may be used in the present invention.

DETAILED DESCRIPTION OF THE INVENTION

The present invention will now be described in the context of its preferred embodiments.

A measuring system 10, constructed according to the present invention, is illustrated in FIG. 1. The measuring system 10 comprises one or more interferometers that measure changes in the interference patterns in light reflected from the ends of optical fiber paths having unequal lengths.

Specifically, the measuring system 10 includes a light source 11, which is preferably a laser producing an optical signal of coherent light in the infrared or visible spectrum. The laser 11 may be directly pulsed, or it may be energized continuously, with its signal being pulsed by a lithium nitrate amplitude modulator 12, operated as an optical gate, or by an equivalent mechanism. The pulsed signal is then fiber-optically transmitted to a phase modulator 13, which creates a phase-generated carrier at a selected carrier frequency.

The pulsed and phase-modulated signal is propagated in a first direction through an optical fiber transmission line 15 to a single interferometer or a plurality of interferometers in series along the transmission line 15. In the illustrated embodiment, three interferometers 31, 101, 121 are shown, for purposes to be described below. For the purposes of the instant discussion, only the first interferometer 31 will be described.

The interferometer 31, which is optically coupled to the transmission line 15 by a fiber optic down-link 36 and a first optical coupler 37, comprises a pair of unequal length optical fiber legs 33, 35. The optical signal propagating through the transmission line 15 in the first direction from the laser 11 is split into two interrogation beams by a second optical coupler 38. The second optical coupler 38, which may be a conventional 3dB optical coupler, directs a first beam into the first leg 33, and a second beans into the second leg 35.

The optical path length of the second optical leg 35 is substantially greater than optical path length of the first leg 33. For example, the optical path length of the first leg 33 is as short as possible, preferably no more than about 10 centimeters in length. The optical path length of the second leg 35 may be as short as about one meter in length.

As will be explained in detail below, the first and second beams are reflected at the ends of the first and second optical fiber legs 33, 35, respectively, returning through the optical legs to the second optical coupler 38, which recombines the reflected light signals for return propagation along the transmission line 15 in a second direction to a photodetector 39. Changes in the relative optical path lengths between the two legs cause changes in the interference patterns in the reflected light when it returns to the transmission line 15. As will be described below, and recognized by those skilled in the art, the analysis of that interference pattern, and of the changes to it, permits changes in the environmental parameters to which the interferometer 31 is exposed (such as pressure and motion) to be determined.

The first optical fiber leg 33 (the shorter leg) has a normal high reflectivity end mirror 41 fixed at its remote, or second, end. This fixed end mirror 41 reflects the first beam propagated through the first leg 33 back into the first leg in the second direction, toward the light source 11 (and toward the detector 39). At the remote, or second, end of the second fiber leg 35, an optical pick-off 51 (of the type described in detail below) includes a silicon sensor chip containing a movable proof mass. The proof mass provides a movable end mirror that reflects the second beam propagated through the second leg 35 back into the second leg in the second direction, toward the light source 11 and the detector 39.

Referring now to FIG. 2, the optical pick-off 51 incorporates a silicon chip sensor 53 mounted on a pick-off support block 54. Silicon chip sensors suitable for the present invention are widely known and readily available. They are relatively inexpensive, and may be manufactured in large quantities. Silicon chip sensors use a movable proof mass to sense changes in the environment, such as velocity, acceleration, or changes in pressure. An exemplary silicon chip sensor 53, as shown in FIG. 2, includes an integral silicon element comprising a movable proof mass 55 attached to a peripheral mounting portion 57 by means of flexible connecting portions 58 along at least two opposed edges of the proof mass. The mounting portion 57 is securely fixed between a first housing portion 59a and a second housing portion 59b, which define between them an internal housing cavity 60 that contains the proof mass 55. The housing portions 59a, 59b advantageously comprise plates of a ceramic material having a low coefficient of thermal expansion, preferably Pyrex® glass (marketed by Corning Glass, Corning, N.Y.), or an equivalent material. The proof mass 55 must be able to move within the cavity 60, as its movement is used to detect changes in environmental parameters, as will be described below. The second housing portion 59b includes an opening 62, approximately aligned with the center of the proof mass 55, through which the second optical beam is directed to the proof mass 55, as will be described below.

The remote end portion of the second optical fiber leg 35 may be contained in a ferrule 63, which may be a ceramic tube. An axial passage through the ferrule 63 holds the remote end portion of the second optical fiber leg 35, and is essentially the same diameter as the diameter of the optical fiber 35. The remote end of the ferrule 63, with the remote end portion of the second optical fiber leg 35 contained therein, is inserted into the opening 62 in the second housing portion 59b of the silicon sensor 53. The proof mass 55 has a highly reflective surface 64 that is spaced from and opposed to an end surface 65 of the second optical fiber leg 35 that lies substantially flush with the end surface of the ferrule 63 within the opening 62. Preferably, this reflective surface 64 is provided by a thin metallic coating, such as gold, to provide a reflectivity close to 100%. Thus the light beam from the fiber 35 passes through air only as it exits the end face 65 of the fiber, is reflected by the surface 64 of the proof mass, and returns to the fiber. The light does not travel through other materials that may distort the beam.

The gap between the end surface 65 of the fiber 35 and the reflective surface 64 of the proof mass 55 should be sufficiently small that there is minimal optical loss from beam spreading as the light exits the end of the fiber and is reflected back into the fiber. Preferably, the gap width is equal to at most a few wavelengths of the light propagating through the fiber. For example, for wavelengths of interest, the gap width would preferably be between about 2.5 microns and about 20 microns, so that the "round trip" distance the light travels in air is in the range of about 5 to about 40 microns. The end surface 65 of the second fiber leg 35 is coated with an anti-reflective coating (not shown) to minimize unwanted etalon reflections between the proof mass 55 and the fiber end surface 65, and to ensure that all of the reflected signal enters the fiber. Also, the anti-reflective coating is needed to substantially eliminate retro-reflection back into the second optical fiber leg 35. The anti-reflective coating on the end surface 65 should have a reflectivity that is less than about 1%, and preferably no more than about 0.1%. The fabrication of optical coatings with such a low degree of reflectivity is known in the art, as shown, for example, in U.S. Pat. No. 5,529,671, the disclosure of which is incorporated herein by reference.

The sensor 53 is mounted on the support block 54 so that the opening 62 in the second housing portion 59b coincides with an axial bore 74 in the support block 54. The axial bore 74 receives the ferrule 63. The remaining length of the second fiber leg 35 outside the ferrule 63 may be contained within a typical fiber jacket (not shown), as is well known in the art. The pick-off support block 54 may be annular, although the specific configuration and dimensions are matters of design choice to suit the particular application of concern.

Thus, the second optical beam passing through the second optical fiber leg 35 emerges from the end surface 65 of the fiber, and passes through the air gap between the fiber end surface 65 and the reflective surface 64 of the moving proof mass 55. The reflective surface 64 reflects the light beam back into the optical fiber leg 35.

The optical pick-off using a silicon sensor can be used to measure velocity or acceleration, or to measure changes in pressure. As is known to those skilled in the art, acceleration is detected when the proof mass 55 of the sensor 53 moves within the cavity 60, and thus relative to the housing portions 59a, 59b. Because the housing portions 59a, 59b are fixed with respect to the second optical leg 35, movement of the proof mass 55 within the cavity 60 also is movement with respect to the second optical leg 35. Such movement changes the width of the optical gap between the reflective surface 64 of the proof mass 55 and the end surface 65 of the second optical leg 35. The inner surface of the first housing portion 59a is spaced a small distance from the proof mass 55, to permit the proof mass 55 to move in a single axis within the cavity 60. The entire structure may be contained in a neutrally buoyant housing (not shown).

Referring to FIG. 3, a modified pick-off 51' having an alternate pick-off support block 82 is shown for use in applications in which a substantially flat structure for the pick-off 51' is necessary or desired. The pick-off support block 82 receives the remote end of the second optical leg 35 and provides an optical path for second optical beam between the end of the second optical leg 35 and the proof mass 55 of the silicon sensor 53. The pick-off support block 82 is preferably formed of a disc-shaped piece of ceramic material, or a material of substantially equivalent thermal stability (i.e., low coefficient of thermal expansion), although its configuration and dimensions are largely matters of design choice, depending on the application.

The remote end portion of the second optical leg 35 is contained in a ferrule 83, which, like the support block 82, should be formed of a material that has a negligible thermal coefficient of expansion, such as a suitable ceramic. The ferrule 83 is inserted into a first lateral bore 85 in the support block 82, with sufficient clearance to allow the ferrule 83 to be axially rotatable within the bore 85 so that the orientation of the light beam may be adjusted for optimal operation, as will be described below. An axial bore through the ferrule 83 holds the remote end portion of the second optical fiber leg 35, which may terminate flush with the end of the ferrule 83, or preferably, as shown in FIG. 3, may protrude slightly from the end of the ferrule 83. The second optical fiber leg 35 has an end face 86 that is preferably angled about eight degrees substantially to eliminate retro-reflection back into the second optical fiber leg 35.

A cylindrical graded index lens (GRIN lens) 87 is optically aligned with the end face 86 of the second fiber leg 35 to focus a light beam emerging from the second optical leg 35 onto the reflective surface 64 of the proof mass 55. There is preferably a gap of approximately 0.2 mm between the end face 86 of the second optical fiber leg 35 and the facing optical surface of the GRIN lens 87. The GRIN lens 87 is contained in a second lateral bore 89 in the support block 82 that is coaxial with the first lateral bore 85.

The sensor 53 is mounted on the surface of the support block 82 so that the optical opening 62 in the second sensor housing portion 59b is aligned with an air-filled optical passage 91 formed axially through the support block 82. To accommodate the ferrule 83, the GRIN lens 87, and the components to be described below, the passage 91 is not necessarily centered in the block 82.

A mirror rod 93 is installed in an eccentric bore 94 in a tubular fitting 95 which, in turn, is installed for axial rotation in a third lateral bore 97 in the support block 82. The inner end of the mirror rod 93 terminates in a mirrored surface 99 that protrudes into the passage 91 so as to receive a light beam emerging from the GRIN lens 87, and that is cut at a 45 degree angle. The second optical beam emerging from the end 86 of the second optical fiber leg 35 propagates through the GRIN lens 87, is then reflected at a 90 degree angle by the mirrored surface 99 on the end of the mirror rod 93, and then propagates through the passage 91. The tubular fitting 95 is rotatable within the third lateral bore 97 so that the impingement point of the light beam on the mirrored surface 99 may be adjusted for optimal operation, i.e., to minimize losses and unwanted reflections. An additional degree of adjustability may be obtained by installing the mirror rod 93 in the tubular fitting 95 so as to be axially rotatable within the eccentric bore 94.

The optical opening 62 in the second sensor housing portion 59b is aligned so that the light path does not pass through the housing material. Since the opening 62 registers with the passage 91 in the pick-off support block 82, the second optical beam propagates only through air once it exits the GRIN lens 87. Thus, the second optical beam propagating through the second optical fiber leg 35 emerges from the end 86 of the fiber, passes through the air gap between the fiber end 86 and the GRIN lens 87, and enters the GRIN lens 87. The GRIN lens 87 images the light beam from the fiber end 86 onto the reflective surface 64 of the proof mass 55. The mirrored surface 99 reflects the beam ninety degrees, causing the light beam to pass through the opening 62 in the second housing portion 59b of the sensor 53, so as to impinge on the reflective surface 64 of the proof mass 55. The reflective surface 64 reflects the light beam back toward the mirrored surface 99. The mirrored surface 99 reflects the reflected beam ninety degrees back into the GRIN lens 87. The reflected beam then passes through the GRIN lens 87 and re-enters the second optical fiber leg 35. Efficient coupling of the light beam from the fiber 35 to the proof mass surface 54 and back is important to obtain maximum effectiveness of the device. There should be minimal back reflections at the fiber end 86 or elsewhere.

The mirrored surface 99 should be adjusted so that the reflected light from the reflective surface 64 propagates exactly along the same path as the beam impinging on the reflective surface 64. Thus, the mirrored surface 99 should direct the beam as close to the center of the proof mass 55 as possible if the proof mass 55 flexes at all during use.

For applications in which changes in the environmental pressure are to be measured (such as a hydrophone system), the structure of the sensor may differ from that shown in FIGS. 2 and 3. As will be understood by those skilled in the art, in such an application the proof mass structure 55, 58 shown in the drawings would be omitted. The structure of such an alternative sensor 53' is shown in FIG. 4. In this variation, the sensor 53' includes a silicon diaphragm 100 that functions as a proof mass, having a flexible central area that flexes in response to changes in environmental pressure. The diaphragm 100 is surrounded by a peripheral rim 102 that is attached to a rigid base plate 104, forming an internal optical cavity 60' between the diaphragm 100 and the base plate 104. The base plate 105 has an optical opening 62' for the passage of the second optical beam, which strikes a reflective surface 64' that is applied directly to the interior surface (which faces the cavity 60') of the diaphragm 100. Pressure changes cause the central area of the diaphragm 100 to move, changing the path length of the optical gap defined by the width of the internal cavity 60'.

Referring again to FIG. 1, the second optical beam reflected from the pick-off 51 (which may be either of the embodiments described above) is propagated back in a second direction through the second optical fiber leg 35, while the first optical beam, reflected from the fixed mirror 41, is propagated back in a second direction through the first optical fiber leg 33. The first and second optical beams are recombined in the second optical coupler 38 so as to form an interference signal that changes with the motion of the movable mirror of the pick-off 51 in response to changes in the value of the environmental parameter. The interference signal is propagated through the down-link 36 and coupled to the transmission line 15 by the first optical coupler 37. The interference signal is propagated through the transmission line 15 and is transmitted to the photodetector 39 by means of an optical fiber link 75 coupled to the transmission line by an optical coupler 73.

Because the second optical beam reflected from the pick-off 51 has traveled a different length than has the first optical beam reflected from the end mirror 41, the light reflected from the pick-off 51 interferes with the light reflected from the end mirror 41, creating an interference pattern that changes as the proof mass 55 moves in response to the changes in the environmental parameter. The interference pattern changes manifest themselves in changes in the value of the interference signal detected by the photodetector 39, which generates an electrical output signal having a value that indicates the changes in the interference signal value. This electrical output signal is input to a microcomputer 77 (after suitable and conventional signal conditioning and digitizing) that processes the electrical signal, by means well known in the art, to correlate changes in the value of the interference signal with changes in the value of the environmental parameter, thereby yielding measurements indicative of changes in the value of the parameter.

In use of the invention as an accelerometer, movement of the body to which the optical pick-off 51 is attached causes the proof mass 55 contained in the housing 59a, 59b to move within the sensor cavity 60. That movement of the proof mass 55 changes the length of the optical path for the light propagating through the second leg 35. Thus, changing the length of the optical path changes the interference pattern in the reflected interference signal that is detected by the photodetector 39. From such changes in the interference pattern in the reflected light, the movement of the proof mass 55 can be determined.

The invention may also be used as a pressure sensor, as in a hydrophone, preferably employing the sensor 53' shown in FIG. 4. Changes in pressure (such as sound waves passing over the pick-off 51) cause the flexible first housing portion 59a' (which serves, in this variation, as the proof mass, as discussed above) to flex, changing the length of the optical path for the light propagating through the second leg 35. Thus, changing the length of the optical path changes the interference pattern in the reflected interference signal that is detected by the photodetector 39. From such changes in the interference pattern in the reflected light, environmental pressure changes can be measured. From such measured pressure changes, information about sound waves causing those changes can be obtained.

Unlike the prior art, the optical fiber components in the present invention do not perform a sensor function. Sensing is all done through the silicon sensor 53 of the pick-off 51. For sensing environmental changes having a frequency above a few tenths of one Hertz, phase delays in the optical fiber legs 33, 35 due to fiber stretching are negligible.

A phase generated carrier necessary for the described system requires a sufficient optical path length mismatch between the two fiber legs 33, 35. Current state of the art with respect to passive fiber optic sensor architectures dictates an optical path length mismatch between the first and second fiber legs 33, 35 should be about 10 cm to about 1 meter. Such an optical path length mismatch is also compatible with current state of the art stable narrow line width laser sources and fiber optic architectures using internal frequency modulation and time division multiplexing or external phase modulation and frequency division multiplexing.

The optical pick-off 51 measures the displacement of the proof mass 55 with respect to the fixed silicon sensor housing 59a, 59b at frequencies above some minimum around one to five Hertz. While the optical path lengths within the fiber legs 33, 35 may slowly drift over time and temperature, such changes cause errors so low in frequency that they can be ignored for the purposes of making measurements with the requisite degree of accuracy. For example, a one degree Celsius change in temperature in one minute may produce fringe motion corresponding to 0.1 Hz, far below the above-mentioned minimum, when the difference between the two fiber legs 33, 35 is approximately one meter.

For use as an accelerometer, the proof mass 55 of a given optical pick-off 51 has a response in one direction only. Three interferometric sensors, each containing its own silicon sensor chip, may be used to measure motion in the three axes x, y, and z. A triad of such sensors may be mounted on one block.

FIG. 1 shows a system incorporating three sensors, such as might be used for measuring velocity or acceleration in three directions. The second and third interferometers 101, 121 used as accelerometers each are substantially identical to the interferometer 31, although they may be either the embodiment of FIG. 2 or that of FIG. 3. It is not necessary for all the interferometers in a particular system to be of the same embodiment, nor is the system limited to any particular number of interferometers.

In FIG. 1, the second interferometer 101 contains unequal length fiber legs 103, 105. One fiber leg 103 is substantially shorter than the other fiber leg 105, the two legs being optically coupled by an optical coupler 106. The shorter leg 103 terminates in a fixed end mirror 107. The longer leg 105 terminates in an optical pick-off 109 that is advantageously substantially identical to either to the optical pick-off 51 or the optical pick-off 51' described above. The second interferometer is coupled to the transmission line 15 by a fiber optic down-link 111 and an optical coupler 113. Similarly, the third interferometer 121 contains unequal length fiber legs 123, 125, joined by an optical coupler 126. The first fiber leg 123 is substantially shorter than the second fiber leg 125. The shorter leg 123 terminates in a fixed end mirror 127. The longer leg 125 terminates in an optical pick-off 129. The third interferometer 121 is optically coupled to the transmission line 15 by a fiber optic down-link 131 and an optical coupler 133. Additional interferometers of the same construction may be added to the system by optically coupling them to the main transmission line 15.

For use in a hydrophone array, a large number of interferometers (employing sensors 53', as shown in FIG. 4) may be arranged in an array to be towed behind a vessel. With sufficient laser source power, dozens of these devices can be driven by one laser. With distributed gain from erbium doping in selected portions of the optical fiber, hundreds of these devices can be driven by one pump and one signal laser.

Although several preferred embodiments have been described herein, such embodiments are exemplary only. A number of variations and modifications may suggest themselves to those skilled in the pertinent arts. For example, the configuration and dimensions of the support blocks 54 (FIG. 2) and 82 (FIG. 3) may be varied to suit different applications. Also, the above-described alignment adjustment mechanism for the mirror rod 93 in the FIG. 3 embodiment may be modified to be adjustable in additional directions, or it may be omitted altogether. These and other variations and modifications that may suggest themselves are considered within the spirit and scope of the invention, as defined in the claims that follow.

What is claimed is:

1. A system for sensing changes in the value of an environmental parameter, comprising:
    a coherent optical signal source;
    an interferometric sensor optically coupled to the light source so as to receive an optical signal therefrom, the sensor comprising:
        first means for splitting the optical signal into first and second beams;
        second means forming first and second optical legs for the first and second beams, respectively, the optical path length through one of the optical legs being longer than the optical path length through the other optical leg;
        a fixed mirror terminating the first optical leg so as to reflect the first beam back into the first optical leg;
        a movable mirror terminating the second optical leg so as to reflect the second beam back into the second optical leg, the movable mirror being movable in response to a change in the value of the parameter; and
        optical coupling means for recombining the first and second beams after their reflection back along their respective optical legs by the fixed and movable mirrors, respectively, so as to form an interference signal;
    optical detector means, responsive to the interference signal, for generating an electrical signal indicative of the value of the interference signal; and
    third means, responsive to the electrical signal, for correlating a change in the value of the interference signal with a change in the value of the parameter.

2. The system of claim 1, wherein the sensor further comprises:
    a proof mass that is movable in response to a change in the value of the parameter; and
    a reflective surface on the proof mass forming the movable mirror.

3. The system of claim 1, wherein the optical path length of the second optical leg is substantially greater than the optical path length of the first optical leg.

4. The system of claim 3, wherein the optical path length of the first optical leg is no more than about 10 centimeters in length, and wherein the optical path length of the second optical leg is at least approximately 1 meter in length.

5. The system of claim 2, wherein the sensor comprises first and second housing portions defining a cavity in which the proof mass is supported for movement, the second housing portion having an optical opening for the passage of the second beam for reflection from the reflective surface.

6. The system of claim 2, wherein the sensor comprises first and second housing portions defining an internal cavity therebetween, wherein the proof mass is formed as a pressure-responsive portion of the first housing portion, wherein the pressure-responsive portion has a reflective surface facing the internal cavity that forms the movable mirror, and wherein the second housing portion has an optical opening for the passage of the second beam for reflection from the reflective surface.

7. An optical pick-off for an interferometric sensing system, comprising:
    a support structure including an optical path having an end; and
    a movable mirror, comprising a proof mass having a reflective surface, that moves in response to changes in an environmental parameter, whereby the movable mirror is disposed with respect to the end of the optical path so that an optical beam emerging from the end of the optical path impinges upon the reflective surface and is reflected from the reflective surface back into the end of the optical path, and whereby the length of the optical path is changed by the motion of the movable mirror.

8. A method of measuring changes in an environmental parameter, comprising the steps of:
    providing a coherent optical signal;
    providing an interferometric sensor having a fixed mirror and a movable mirror that is movable in response to changes in the value of the environmental parameter;
    directing the optical signal into the sensor so as to obtain an interference signal as the output from the sensor, the interference signal having a value that varies in response to the motion of the movable mirror;
    detecting the variations in the interference signal value; and
    correlating the interference signal value variations with changes in the value of the environmental parameter.

9. The optical pick-off of claim 7, further comprising a housing having an internal cavity, wherein the proof mass is movably supported within the cavity, and wherein the housing has an optical opening aligned with the optical path to permit the passage of an optical beam between the reflective surface and the end of the optical path.

10. The optical pick-off of claim 7, wherein the proof mass is a pressure-responsive diaphragm having a peripheral rim, and wherein the pick-off further comprises a base plate to which the peripheral rim is attached so that an internal cavity is formed between the diaphragm and the base plate, the diaphragm being disposed so that the reflective surface faces the internal cavity, and wherein the base plate has an optical opening aligned with the optical path to permit the passage of an optical beam between the reflective surface and the end of the optical path.

11. The optical pick-off of claim 9, wherein the optical path is defined by an optical fiber, wherein the end of the optical path is the end surface of the optical fiber, and wherein the support structure comprises:

a support block; and a fiber-holding member that holds the optical fiber in the support block, whereby the end surface of the optical fiber is disposed within the optical opening.

12. The optical pick-off of claim 11, wherein the support block has a bore aligned with the opening, and wherein the fiber-holding member includes a ferrule disposed in the bore, the ferrule having an axial passage containing the optical fiber, whereby the end surface of the optical fiber is disposed within the optical opening.

13. The optical pick-off of claim 10, wherein the optical path is defined by an optical fiber, wherein the end of the optical path is the end surface of the optical fiber, and wherein the support structure comprises:

a support block; and a fiber-holding member that holds the optical fiber in the support block, whereby the end surface of the optical fiber is disposed within the optical opening.

14. The optical pick-off of claim 13, wherein the support block has a bore aligned with the opening, and wherein the fiber-holding member includes a ferrule disposed in the bore, the ferrule having an axial passage containing the optical fiber, whereby the end surface of the optical fiber is disposed within the optical opening.

15. The optical pick-off of claim 9, wherein the support structure comprises a support block having an axial optical passage aligned with the optical opening, wherein the optical path is oriented substantially transverse to the optical path, and wherein the support structure further comprises beam directing means for directing the optical beam from the end of the optical path into the optical passage, through the optical opening, and onto the reflective surface.

16. The optical pick-off of claim 15, wherein the end of the optical path is located so as to direct the optical beam into the optical passage in a direction substantially transverse to the axis of the passage, and wherein the beam directing means comprises:

an angled mirror disposed in the support block so as to receive the optical beam in the optical passage, and oriented so as to reflect the beam through the optical opening and onto the reflective surface.

17. The optical pick-off of claim 15, further comprising:

imaging lens means, disposed in the block between the end of the optical path and the optical passage, for imaging the optical beam onto the reflective surface.

18. The optical pick-off of claim 16, wherein the angled mirror is rotatable so as to change the point of impingement of the optical beam on the reflective surface.

19. The optical pick-off of claim 18, wherein the angled mirror is mounted for rotation in the support block and has a reflective end face disposed in the optical passage, the end face being oriented at an angle so as to receive the optical beam in the optical passage and to reflect the beam toward and into the optical opening.

20. The optical pick-off of claim 19, wherein the angled mirror comprises a rod disposed axially for axial rotation in an eccentric bore of a tube mounted in the support block.

21. The method of claim 8, wherein the detecting step comprises the step of generating an electronic output signal having a value indicative of the value of the interference signal, and wherein the correlating step comprises the step of correlating the value of electronic output signal with changes in the value of the environmental parameter.

22. The method of claim 8, wherein the environmental parameter is velocity.

23. The method of claim 8, wherein the environmental parameter is pressure.

24. The method of claim 8, wherein the sensor has a first optical leg terminated by the fixed mirror and a second optical leg terminated by the movable mirror, and wherein the directing step comprises the step of splitting the optical signal into a first beam directed to the first leg and a second beam directed to the second leg.

* * * * *

UNITED STATES PATENT AND TRADEMARK OFFICE
CERTIFICATE OF CORRECTION

PATENT NO. : 5,949,740
DATED : September 7, 1999
INVENTOR(S) : Hall

It is certified that error appears in the above-identified patent and that said Letters Patent is hereby corrected as shown below:

Title page, item [75], insert --Samuel N. Fersht, Studio City, Calif.-- as an inventor.

Column 3, line 22, "nitrate" should be --niobate--.

Column 3, line 43, "beans" should be --beam--.

Column 7, line 18, "105" should be --104--.

Signed and Sealed this

Ninth Day of May, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO. : 5,949,740

DATED : September 7, 1999

INVENTOR(S) : HAJIME NAKAJIMA, ET AL..

It is certified that error appears in the above-identified patent and that said Letters Patent is hereby corrected as shown below:

Cover Item
[30] <u>Foreign Application Priority Data</u>:
"Oct. 3, 1997" should read --Oct. 3, 1994--.

Cover Item
[56] <u>FOREIGN PATENT DOCUMENTS</u>:
"03036040" should read --3-036040--.

<u>COLUMN 4</u>:
Line 25, "guide" should read --guides-.

<u>COLUMN 5</u>:
Line 10, "been" should read --been completed--.

Signed and Sealed this

Twenty-fifth Day of July, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,949,740

DATED : September 7, 1999

INVENTOR(S) : David B. Hall

It is certified that error appears in the above-identified patent and that said Letters Patent is hereby corrected as shown below:

This certificate supercedes Certificate of Correction issued July 25, 2000, the number was erroneously mentioned and should be deleted since no Certificate of Correction was granted.

Signed and Sealed this

Twenty-seventh Day of March, 2001

*Attest:*

NICHOLAS P. GODICI

*Attesting Officer*  *Acting Director of the United States Patent and Trademark Office*